(12) United States Patent
Kim

(10) Patent No.: US 11,719,215 B2
(45) Date of Patent: Aug. 8, 2023

(54) CONDUIT TURBINE FOR SUPPORTING CONDUIT OF WATER WHEEL ROTATIONAL BODY, AND HYDROELECTRIC GENERATOR HAVING CONDUIT TURBINES SERIALLY PROVIDED IN MULTIPLE LEVELS

(71) Applicant: Seongsik Kim, Ansan-si (KR)

(72) Inventor: Seongsik Kim, Ansan-si (KR)

( * ) Notice: Subject to any disclaimer, the term of this patent is extended or adjusted under 35 U.S.C. 154(b) by 0 days.

(21) Appl. No.: 17/413,294

(22) PCT Filed: Sep. 6, 2019

(86) PCT No.: PCT/KR2019/011532
§ 371 (c)(1),
(2) Date: Jun. 11, 2021

(87) PCT Pub. No.: WO2020/050675
PCT Pub. Date: Mar. 12, 2020

(65) Prior Publication Data
US 2022/0074381 A1 Mar. 10, 2022

(30) Foreign Application Priority Data

Sep. 7, 2018 (KR) .......................... 10-2018-0107129
Sep. 17, 2018 (KR) .......................... 10-2018-0110623

(51) Int. Cl.
*F03B 13/08* (2006.01)
*F03B 3/04* (2006.01)
(Continued)

(52) U.S. Cl.
CPC .............. *F03B 13/083* (2013.01); *F03B 3/04* (2013.01); *F03B 11/00* (2013.01); *F03B 11/063* (2013.01);
(Continued)

(58) Field of Classification Search
CPC ........ F03B 13/083; F03B 3/04; F03B 11/063; F03B 17/06; H02K 7/116; H02K 7/1823; F05B 2220/706; F05B 2260/4031
(Continued)

(56) References Cited

U.S. PATENT DOCUMENTS

| 1,396,609 A | 11/1921 | Weisenborn |
| 8,142,154 B2 * | 3/2012 | Gartner ..................... F03D 5/00 416/81 |

(Continued)

FOREIGN PATENT DOCUMENTS

| CN | 1370257 A | 9/2002 |
| CN | 1632305 A | 6/2005 |

(Continued)

*Primary Examiner* — Charles Reid, Jr.
(74) *Attorney, Agent, or Firm* — Maschoff Brennan

(57) ABSTRACT

The hydroelectric generator using a conduit turbine is furnished with a driving shaft which penetrates the center of a conduit through which a flow passes to the inside; a conduit support main body which is provided so as to support the driving shaft; a propeller which is fixed to the driving shaft, and rotates by the movement of the flow; an internal gear which rotates together with the driving shaft from between the conduit support main bodies; an external gear which is driven together with a shaft, outside the conduit, as a rotational force is delivered to the internal gear; and an electric generator.

6 Claims, 11 Drawing Sheets

(51) Int. Cl.
*F03B 11/06* (2006.01)
*F03B 17/06* (2006.01)
*H02K 7/116* (2006.01)
*H02K 7/18* (2006.01)
*F03B 11/00* (2006.01)
*F03B 13/06* (2006.01)

(52) U.S. Cl.
CPC ............. *F03B 13/06* (2013.01); *F03B 13/08* (2013.01); *F03B 17/06* (2013.01); *H02K 7/116* (2013.01); *H02K 7/1823* (2013.01); *F05B 2220/706* (2013.01); *F05B 2260/4031* (2013.01)

(58) Field of Classification Search
USPC ...................................................... 290/43, 54
See application file for complete search history.

(56) References Cited

U.S. PATENT DOCUMENTS

| | | | | |
|---|---|---|---|---|
| 2005/0121915 | A1* | 6/2005 | Leijon | F03B 13/1885 290/42 |
| 2008/0116689 | A1* | 5/2008 | Alstot | F03G 7/005 290/43 |
| 2013/0026762 | A1* | 1/2013 | Rajadhyaksha | F03B 17/063 290/54 |
| 2013/0088013 | A1* | 4/2013 | Yan | F03B 17/063 290/54 |
| 2013/0088015 | A1* | 4/2013 | Walton | F03B 3/00 290/54 |
| 2015/0345461 | A1* | 12/2015 | Kanemoto | F03B 3/04 290/52 |
| 2018/0313324 | A1* | 11/2018 | Yeo | F03B 15/18 |
| 2019/0101097 | A1* | 4/2019 | Suzuki | F03B 13/10 |
| 2019/0368464 | A1* | 12/2019 | Knotts | F03B 17/061 |

FOREIGN PATENT DOCUMENTS

| | | |
|---|---|---|
| CN | 2866889 Y | 2/2007 |
| DE | 102007034618 A1 | 1/2009 |
| JP | 2002-242811 A | 8/2002 |
| JP | 2002242811 A * | 8/2002 |
| JP | 2003-214309 A | 7/2003 |
| JP | 2003214309 A | 7/2003 |
| JP | 2009228462 A | 10/2009 |
| JP | 2015535331 A | 12/2015 |
| KR | 10-1505558 B1 | 3/2015 |
| KR | 101505558 * | 4/2015 |
| KR | 101505558 B1 | 4/2015 |
| KR | 20-0478748 | 11/2015 |
| KR | 10-2016-0025848 A | 3/2016 |
| KR | 10-1769080 B1 | 8/2017 |
| KR | 101769080 B1 | 8/2017 |
| KR | 10-1868973 | 6/2018 |
| WO | 2009/116559 A1 | 9/2009 |
| WO | 2017/146349 A1 | 8/2017 |
| WO | 2017/164091 A1 | 9/2017 |

* cited by examiner

CONDUIT TURBINE FOR SUPPORTING CONDUIT OF WATER WHEEL ROTATIONAL BODY, AND HYDROELECTRIC GENERATOR HAVING CONDUIT TURBINES SERIALLY PROVIDED IN MULTIPLE LEVELS

TECHNICAL FIELD

The present invention relates to a hydroelectric power generator using a conduit turbine, and more particularly, to a hydroelectric power generator in which conduit turbines are installed serially in multiple levels to produce a lot of power at low cost, maintain the quality of electric power and stably supply the electric power.

BACKGROUND ART

Recently, main methods for producing electric power include hydroelectric power generation using hydropower, thermal power generation using fossil fuels, nuclear power generation using nuclear power, and the like.

The thermal power generation and the nuclear power generation are regulated a lot in developed countries due to environmental issues. However, the hydro power generation is considered as an environmentally friendly generation since a turbine is used to convert potential energy of water into kinetic energy and then produces electric power, and thus pollutant emissions or environmental risks do not exist.

However, since civil engineering works and large-scale facility investments are required, the hydroelectric power generation is mainly implemented in a manner that large turbines and generators are installed in a power generation dam or multi-purpose dam. Accordingly, there are problems that the construction of a system for the hydroelectric power generation requires enormous investment in advance, and it is difficult to adequately respond to situations in which the amount of contained water increases or decreases due to climate change and the like.

In addition, since the installation of large and expensive turbines and generators at places having low flow rates, such as small dams and reservoirs, is inefficient, it is difficult to apply the hydroelectric power generation. In addition, it is more difficult to apply to the situation that a space for installing the large turbines and generators is insufficient or does not exist.

Meanwhile, an energy storage system (ESS) is used to build an uninterruptible power supply (UPS) or store generated power. The ESS stores excessively produced electric power or commercial power and provides the electric power when electric power is temporarily insufficient or disconnected. The ESS mainly includes a battery type that uses batteries such as lithium-ion. As a price of the above material increases gradually, the economic feasibility is lowered and the price of the ESS is increasing.

Related art 1: Korean Utility Model Registration No. 20-0478748 (Registered on Nov. 5, 2015)
Related art 2: Korean Patent Registration No. 10-1868973 (Registered on Jun. 12, 2018)

DISCLOSURE

Technical Problem

An object of the present invention is to provide a hydroelectric power generator capable of efficiently generating electric power at low cost.

In addition, another object of the present invention is to provide a hydroelectric power generator capable of efficiently generating electric power even with a small flow rate.

In addition, another object of the present invention is to provide a hydroelectric power generator that can be used for the construction of ESS by potential energy of water.

In addition, still another object of the present invention is to provide a hydroelectric power generator for enabling a replacement or maintenance without stopping the entire power generator even when a breakdown or maintenance factor occurs, such that electric power is stably supplied.

Still another object of the present invention is to provide a hydroelectric power generator for facilitating an additional installation compared to the existing hydroelectric power generator.

Technical Solution

The hydroelectric generator using a conduit turbine according to one aspect of the present invention includes at least two conduit turbine units (100) serially arranged in multiple levels, the conduit turbine units (100) each comprising: a driving shaft (2) which penetrates the center of a conduit (22) into which a flow for electric generation passes; conduit support main bodies (4) provided so as to support the driving shaft (2) and be rotated freely, and having an arm (6) extending towards the inner surface of the conduit (22); a propeller (7) disposed between the conduit support main bodies (4), fixed to the driving shaft (2), and rotated by means of a flow movement; an internal gear (8) rotated between the conduit support main bodies (4) together with the driving shaft (2); an external gear (13) driven outside the conduit (22) together with a shaft (11) as a rotational force is delivered to the internal gear (8) by means of a driving force delivery device; and an electric generator (10) which generates electricity by receiving the rotational force of the external gear (13) and the shaft (11).

In the hydroelectric power generator using the conduit turbine, a flexible pipe (18) having a corrugated pipe structure may be further installed while extending from a lower end of the conduit (22).

In the hydroelectric power generator using the conduit turbine, a pressure support (3) integrally coupled with the driving shaft (2) is installed at a tip of the conduit support main body (4), and a thrust bearing (26) may be provided at a contact portion between the conduit support main body (4) and the pressure support (3).

In the hydroelectric power generator using the conduit turbine, an auxiliary conduit system (200) may be further installed outside the tube conduit turbine units (100) continuous arranged in multi levels.

In the hydroelectric power generator using the conduit turbine, the auxiliary conduit system (200) may include an auxiliary conduit (33), and a conduit switching valve main body (35) for switching a flow path by a conduit switching valve (30) position-switched toward the conduit turbine unit (100) and toward the auxiliary conduit (33) by a cylinder device (31).

In the hydroelectric power generator using the conduit turbine, the auxiliary conduit system (200) may further include two drain conduits (29 and 34) connected to the conduit (22) and the auxiliary conduit (33) from the top of the conduit switching valve main body (35), respectively; two filling conduits (32 and 36) connected to the conduit (22) and the auxiliary conduit (33) from the bottom of the conduit switching valve main body (35), respectively; a discharge water pipe (44) connected to selectively drain water from the two drain conduits (29 and 34); and a filling water pipe (42) connected to selectively fill the two filling conduits (32 and 36) with water.

In the hydroelectric power generator using the conduit turbine, the arm (6) of the conduit support main body (4) may have a flat plate shape to minimize a sectional area resisting against streamline, and may have a length longer than a radius of the conduit (22) in an axial direction.

Advantageous Effects

In the hydroelectric power generator using the conduit turbine according to the present invention, the conduit turbine unit (100) may be configured using a low-cost and small-scale propeller (7), generator (10), and the like, and installed in multiple levels instead of the conduit (22), so that large amounts of electric power can be produced at low cost, and the number of installations can be easily increased or decreased as needed.

In addition, in the hydroelectric power generator using the conduit turbine according to the present invention, a device having a diameter slightly smaller than a diameter of a water guide pipe (50) is installed instead of the water guide pipe (50), so that the electric power can be efficiently produced, and an installation space can be saved.

In addition, when the hydroelectric generator using the conduit turbine according to the present invention is used, the hydroelectric generators are installed in multiple levels between artificial water tanks (49 and 59), so that the ESS by potential energy of water can be constructed.

In addition, in the hydroelectric generator using the conduit turbine according to the present invention, the conduit turbine unit (100) in a broken section can be easily replaced or repaired, and the power supply is not interrupted, but can be stably maintained in the above process.

In addition, in the hydroelectric generator using the conduit turbine according to the present invention, the power generator can be easily installed by the scheme of assembling conduit pipes.

In addition, in the hydroelectric generator using the conduit turbine according to the present invention, existing facilities such as dams, hydroelectric dams, pumping power plants upper reservoir and the like can be used, and power generation capacity can be remarkably increased even with a small flow rate. Accordingly, clean energy can be obtained that does not damage the environment and does not emit any environmental pollutants in the power generation process.

BEST MODE

Mode for Invention

Figure 1:
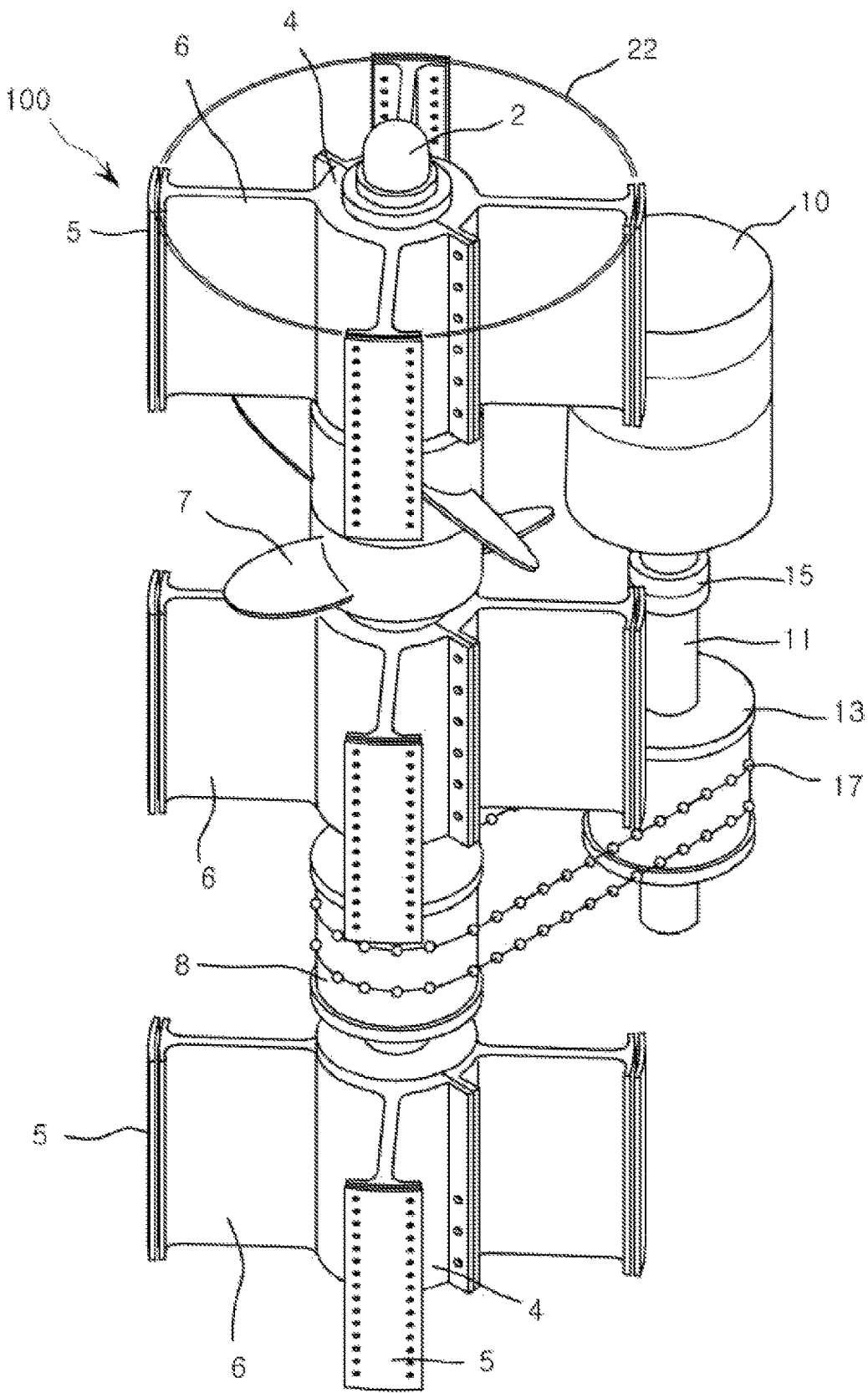
FIG. 1 is a perspective view showing the configuration of a conduit turbine unit according to one embodiment of the present invention.
Figure 2:
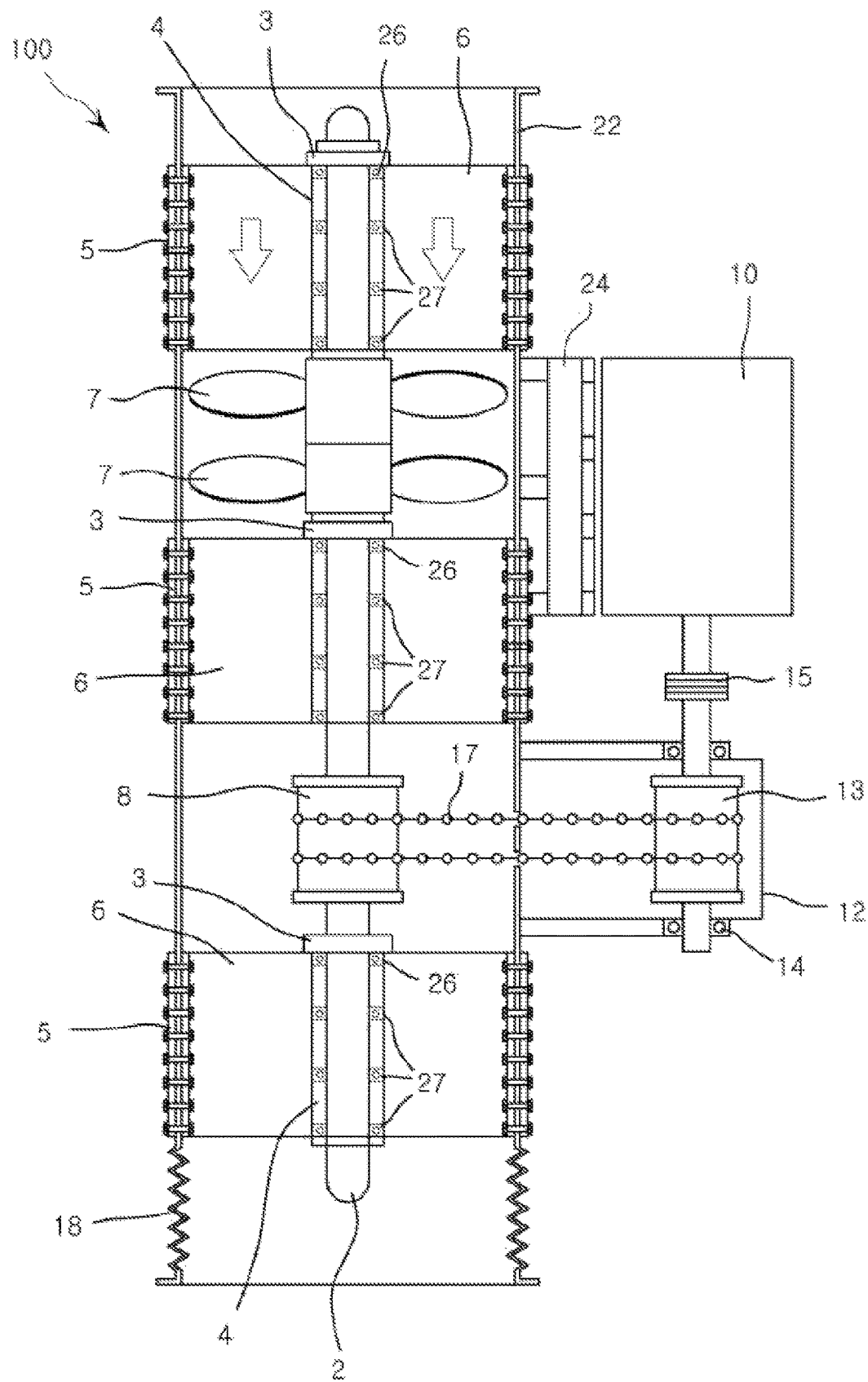
FIG. 2 is a longitudinal sectional view of FIG. 1.
Figure 3:
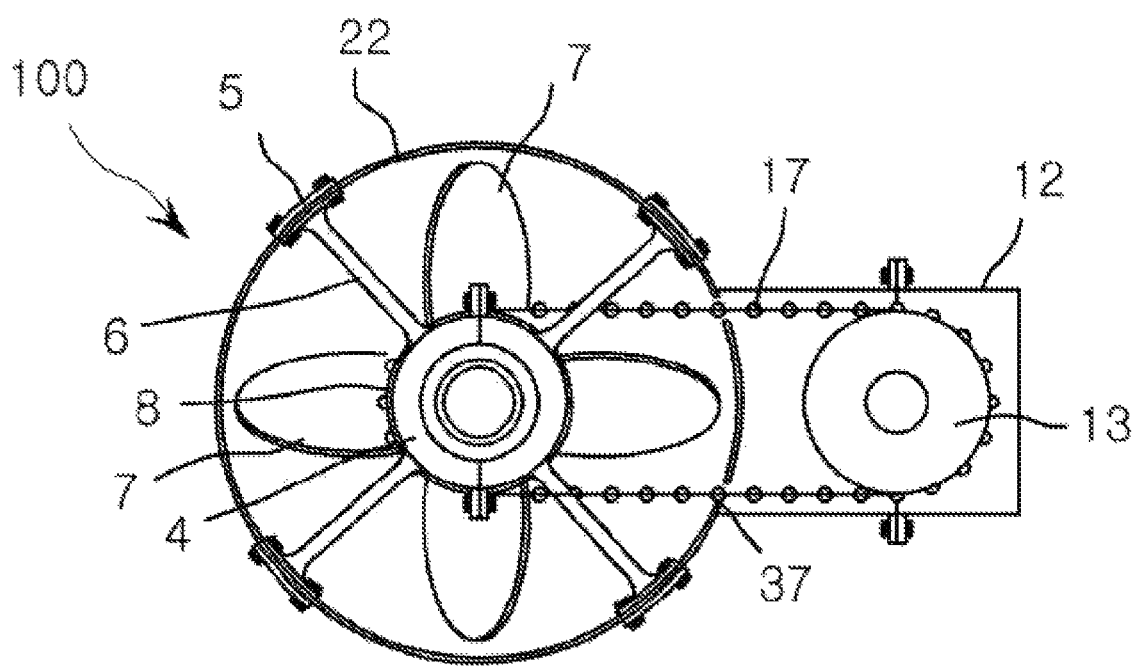
FIG. 3 is a plan view of FIG. 1.

The objects, specific advantages and novel features of the present invention will be more apparent from the following detailed description and embodiments in connection with the accompanying drawings. Herein, it should be noted that the same elements have the same number as possible in adding reference numerals for elements in the drawings even if the elements are indicated on different drawings.

In addition, for describing the present invention, the detailed description of the known art related to the present invention incorporated herein will be omitted when it possibly makes the subject matter of the present invention unclear unnecessarily. In the accompanying drawings, some components are exaggerated, omitted or schematically illustrated, and the size of each component is not always reflected as an actual size.

Hereinafter, embodiments of the present invention will be described in detail with reference to the accompanying drawings.

The hydroelectric power generator using the conduit turbine according to one exemplary embodiment of the present invention enables hydroelectric power generation using head drops and flow rates of water that is stored in a dam or pumped by water-pumping.

The conduit turbine units 100 are continuously installed in multiple levels in a water guide pipe extending in one longitudinal direction, and each conduit turbine unit 100 converts potential energy of fluid (water) stored in a dam or pumped by water-pumping into kinetic energy and converts kinetic energy into electrical energy. Accordingly, when power generation capacities of the conduit turbine units 100 are combined, the total power generation capacity may be increased to a large capacity.

In the conduit turbine unit 100, a driving shaft 2 installed in a center of a conduit 22, through which the fluid (water) moves, is supported by a conduit support main body 4, so that the rotational movement of the driving shaft 2 may be stably maintained.

The conduit support main body 4 is supported on an inner surface of the conduit 22 through several (preferably four) arms 6 having the same length, and the arm 6 is fastened to a fixture 5 positioned on an outer surface of the conduit 22 by using a plurality of bolts, so that the conduit 22 and the driving shaft 2 stably supports the rotation of the driving shaft 2 while being maintained coaxially.

The conduit support main body 4 is divided into, for example, two pieces, and fastened and assembled to a flange with bolts, and is assembled in a cylindrical shape while bearings 26 and 27 are installed therein.

For example, three bearings 27 are provided at a contact portion between the conduit support main body 4 and the driving shaft 2, thereby supporting the rotation of the driving shaft 2. In particular, a thrust bearing 26 is provided at a contact portion between the conduit support main body 4 and the pressure support 3, so that a pressure support 3 and the drive shaft 2 applying a load in the axial direction to the conduit support main body 4 may be supported while rotating without resistance.

A foremost tip of the drive shaft 2 is formed in a semicircular or pointed cone shape to reduce water surface head resistance, and the pressure support 3 is installed to be integrally coupled with the driving shaft 2 a tip portion of each conduit support main body 4 so that the load of the driving shaft 2 and the like is supported by each conduit support main body 4 while being supported in a state in which the rotation is freely conducted by the above-described thrust bearing 26.

Every tip portion of the conduit support main body 4 is provided with the pressure support 3. Since the pressure is increased when the fluid flowing in the conduit 22 is flow fast and the flow rate is large, the conduit support main bodies 4 are installed in three places as shown in the drawing, so that the driving shaft 2 is stably supported and the pressure is distributed.

In addition, the arm 6 of the conduit support main body 4 has a flat plate shape to minimize a sectional area resisting against streamline, and has a length longer than a radius of the conduit 22 in the axial direction, thereby correcting the streamline disturbed by a propeller 7, so that the efficiency of power generation is improved.

One or multiple propellers 7 are installed between the conduit support bodies 4, so that the driving shaft 2 is rotated together with the propeller 7 by energy of a flow rate state quantity (head drop, flow rate, flux) when the fluid flows into the conduit 22. For example, according to the drawing, two two-leaf propellers 7 are installed on the driving shaft 2 in series, however, other various embodiments are applicable, for example, one or two four-leaf propellers 7 may be installed.

Some of the energy in the fluid are converted into rotational kinetic energy by the propeller 7, and thus a generator 10 may be driven through an internal gear 8 and an external gear 13. The internal gear 8 is fixedly installed on the driving shaft 2 inside the conduit 22 so as to be driven together with the driving shaft 2, and the external gear 13 driven together outside the conduit after receiving the rotational force of the internal gear 8 is connected to the generator 10.

A ball chain 17 formed of stainless steel wire is provided as a device for connecting the internal gear 8 and the external gear 13 to transmit rotational motive power, so that a stable operational efficiency can be achieved since there is no risk of mechanical damage or corrosion inside the conduit in which water always flows. The ball chain 17 may be preferably provided with two rows as shown in the drawing to effectively and stably transmit the motive power, since the rotational kinetic energy of the driving shaft 2 is large. Meanwhile, any power transmission device, such as a different type of chain or timing belt, may be selected instead of the ball chain 17.

Figure 5:
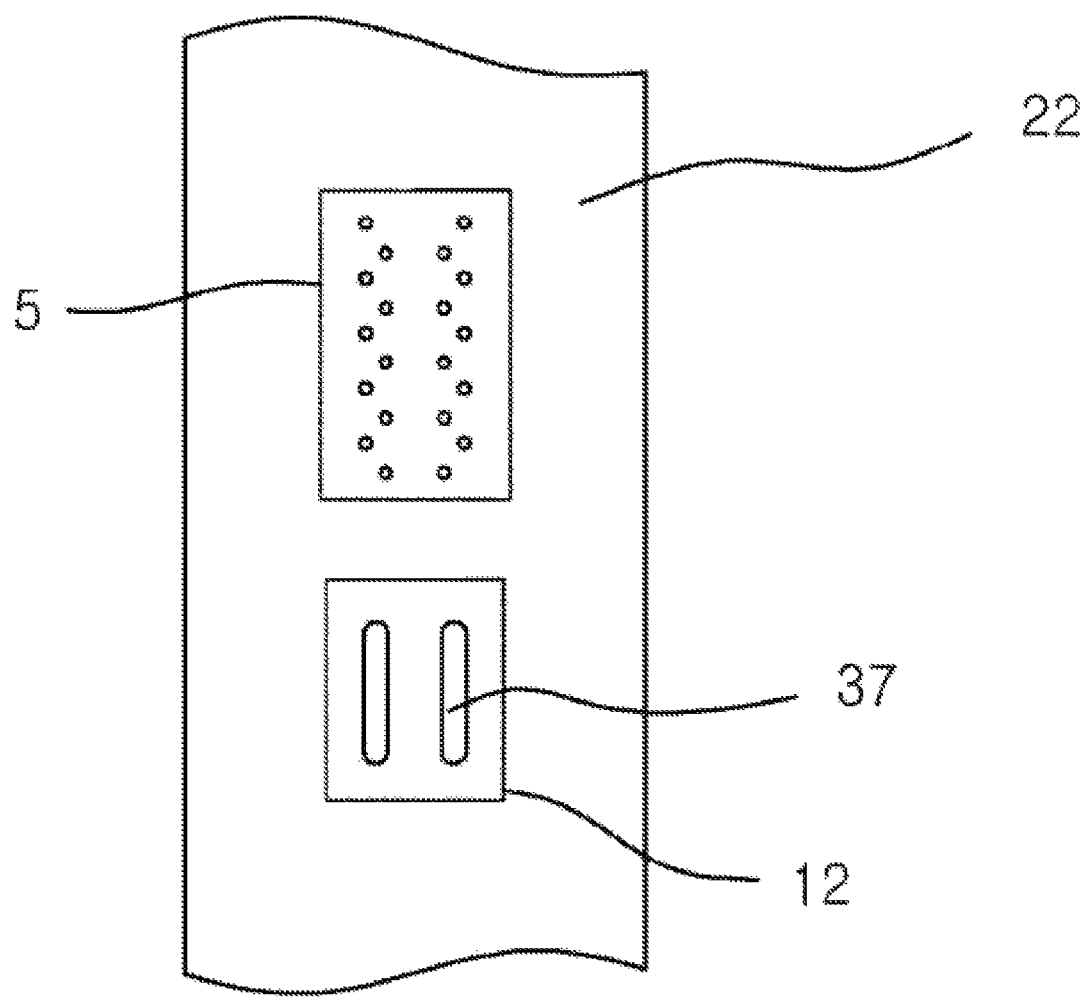
FIG. 5 is a main view showing holes through which a ball chain passes and bolt holes for mounting a fixture are perforated in the conduit turbine unit according to one embodiment of the present invention.
Figure 6:
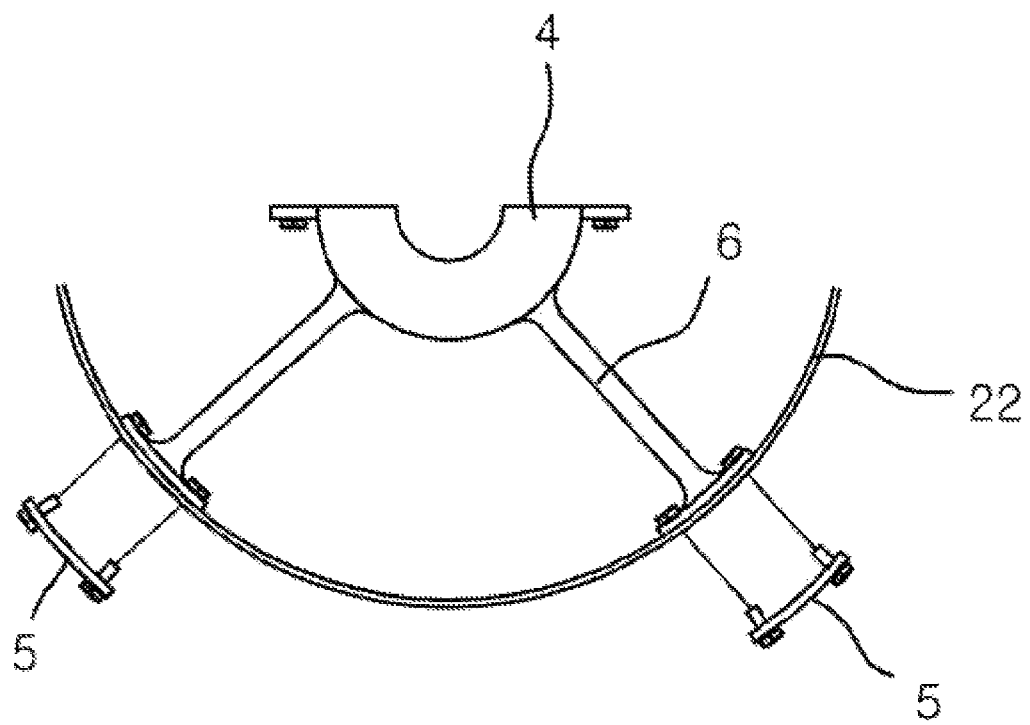
FIG. 6 is a plan view showing a disassembled state of a conduit support main body and the fixture.

The conduit support main body 4 is also installed on both sides of the internal gear 8 so as to be supported in a stably rotatable state. Holes 37 are perforated in the conduit 22 at a position through which the ball chain 17 passes so as to transmit the motive power to the external gear 13 through the ball chain 17 (see FIG. 5).

In addition, the external gear 13 is wrapped and sealed with a case 12 to prevent water from flowing outside the external gear 13 and prevent air from being introduced from the outside thereof. The case 12 is assembled using bolts, so that internal devices may be easily assembled or disassembled.

The external gear 13 is coaxially connected to generator 10, and has a shaft 11 axially supported by bearings 14 so as to be freely rotated, and the motive power is connected between the shaft 11 and the generator 10 through a coupling 15. The generator 10 is stably installed outside the conduit 22 by a generator support 24.

Meanwhile, a flexible pipe 18 is fixed to a lower end of the conduit 22 by welding or fastening a bolt to a flange. The flexible pipe 18 having a corrugated pipe structure corrects a length error in the piping process so that the piping work may be easily performed, and the work may be conveniently performed when one of the conduit turbine units 100 is disassembled and replaced or repaired while the conduit turbine units are installed in multiple levels.

In addition, when vibration occurs in the entire generator, the vibration is absorbed, a buffer is performed to prevent impacts from being transmitted to the entire pipes even when natural disasters such as earthquakes occur, so that the stability may be improved.

Figure 4:
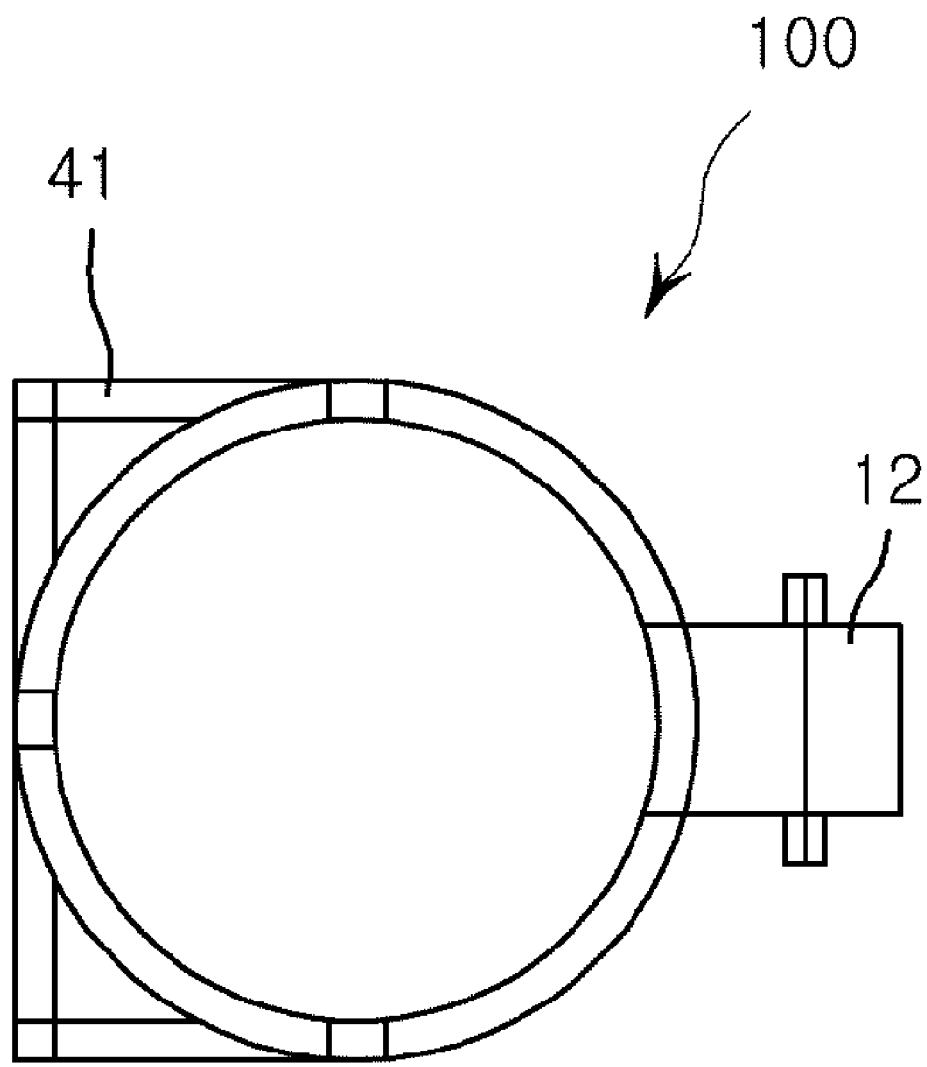
FIG. 4 is a plan view showing a state in which the conduit turbine unit according to one embodiment of the present invention is supported by a fixed frame.

The conduit turbine units 100 having the above structure are repeatedly installed in multiple levels. In order to stably maintain the installation state, the conduit turbine units are rigidly assembled and installed outside of the conduit 22 in a field by using a fixed frame 41 in which vertical beams and cross beams are configured from the bottom surface as a structure type (see FIG. 4).

Figure 7:
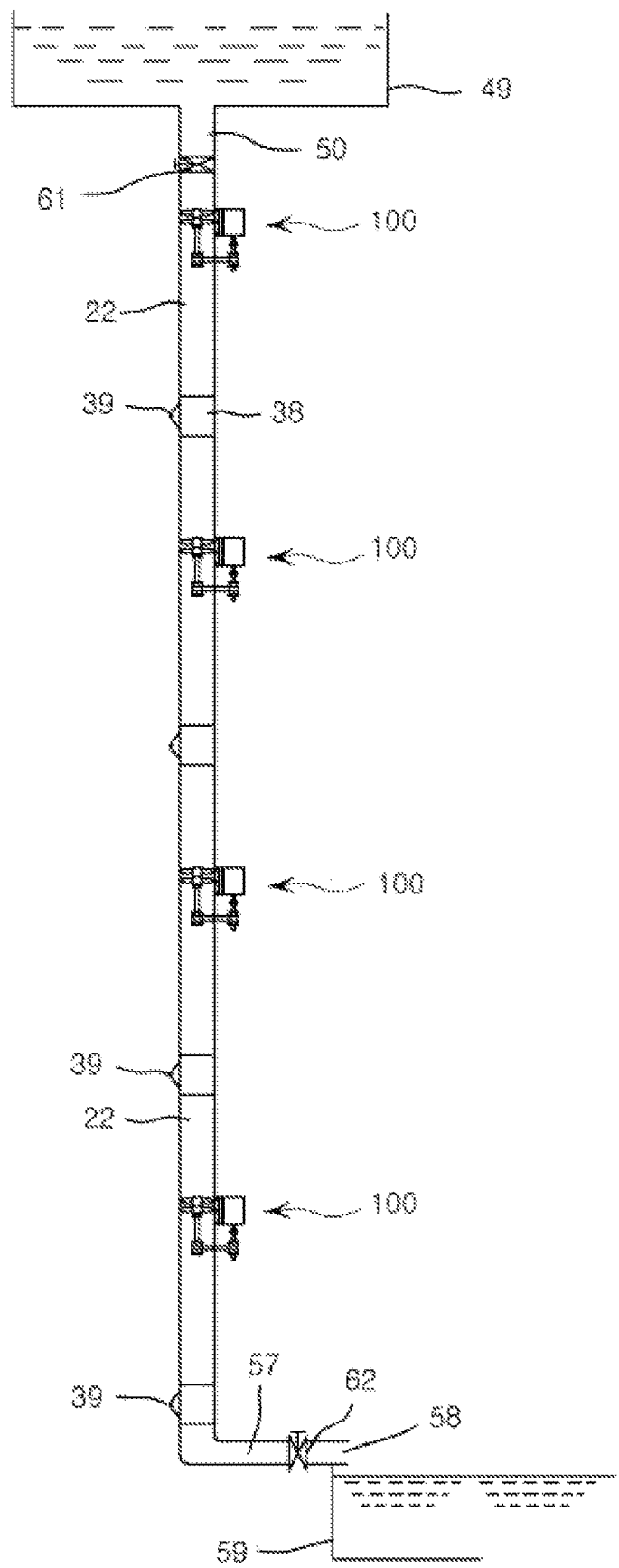
FIG. 7 is an installation diagram showing a state in which the conduit turbine units are arranged in multiple levels.
Figure 8:
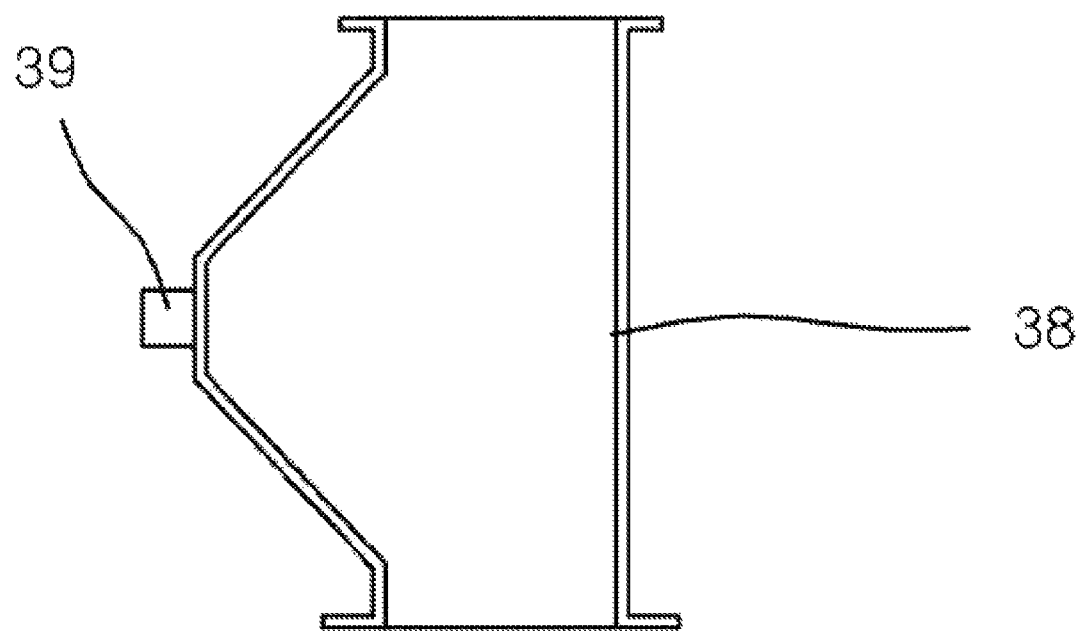
FIG. 8 is a sectional view showing the configuration of an air vent pipe provided with an air vent.

As shown in FIG. 7, according to the hydroelectric power generator of the present invention, when the flow amount is stored in the upper water storage tank 49 by the dam or water-pumping, water is dropped through the water guide pipe 50 and the valve 61 connected to an upper portion of the conduit turbine units 100 installed in multiple levels, so that electric power is generated through the generator 10. In addition, the discharge conduit 57, the valve 62, and the discharge port 58 may be connected and piped to the last turbine unit 100, and water from the discharge port 58 may be discharged to a river or lower water storage tank 59. In addition, air vent pipes 38 equipped with air vents 39 are installed at predetermined sections in the middle of the conduit 22, so that the air inside the conduit 22 is discharged to the outside.

In the hydroelectric power generator using the conduit turbine according to the present invention, the conduit turbine unit 100 may be configured using a low-cost and small-scale propeller 7, generator 10, and the like, and installed in multiple levels instead of the conduit 22, so that large amounts of electric power can be produced at low cost, and the number of installations can be easily increased or decreased as needed.

In addition, in the hydroelectric power generator using the conduit turbine according to the present invention, a device having a diameter slightly smaller than a diameter of a water guide pipe 50 is installed instead of the water pipe 50, so that the electric power can be efficiently produced, and an installation space can be saved.

In addition, when the hydroelectric generator using the conduit turbine according to the present invention is used, the hydroelectric generators are installed in multiple levels between artificial water tanks 49 and 59, so that the ESS by potential energy of water can be constructed.

In a system that generates power by installing the tube rotor unit 100 in multiple levels, it may be preferable to further install an auxiliary conduit system 200 to increase the driving efficiency and stably maintain a state of electric power production.

Figure 9:
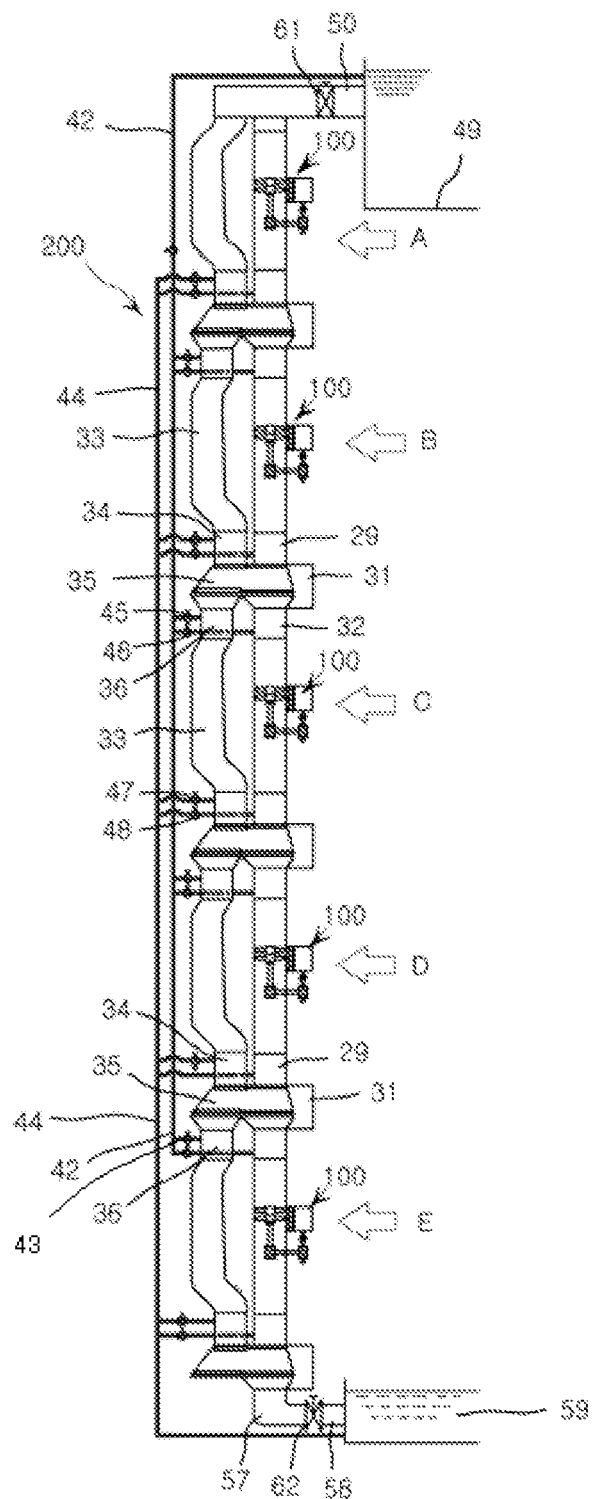
FIG. 9 is an overall installation diagram illustrating a state in which auxiliary conduits of the present invention are piped.
Figure 10:
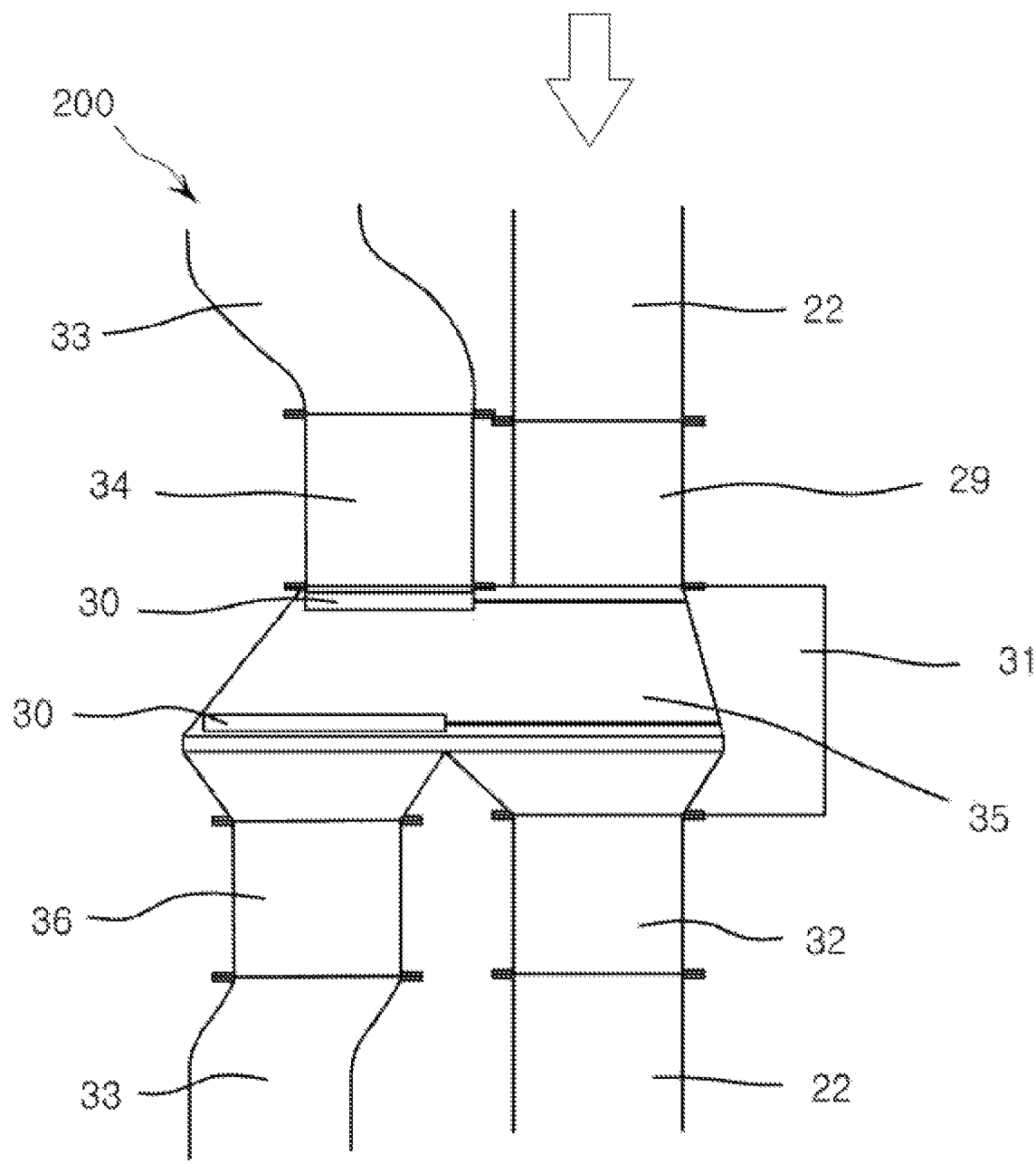
FIG. 10 is an enlarged view of a main part of FIG. 9.
Figure 11:
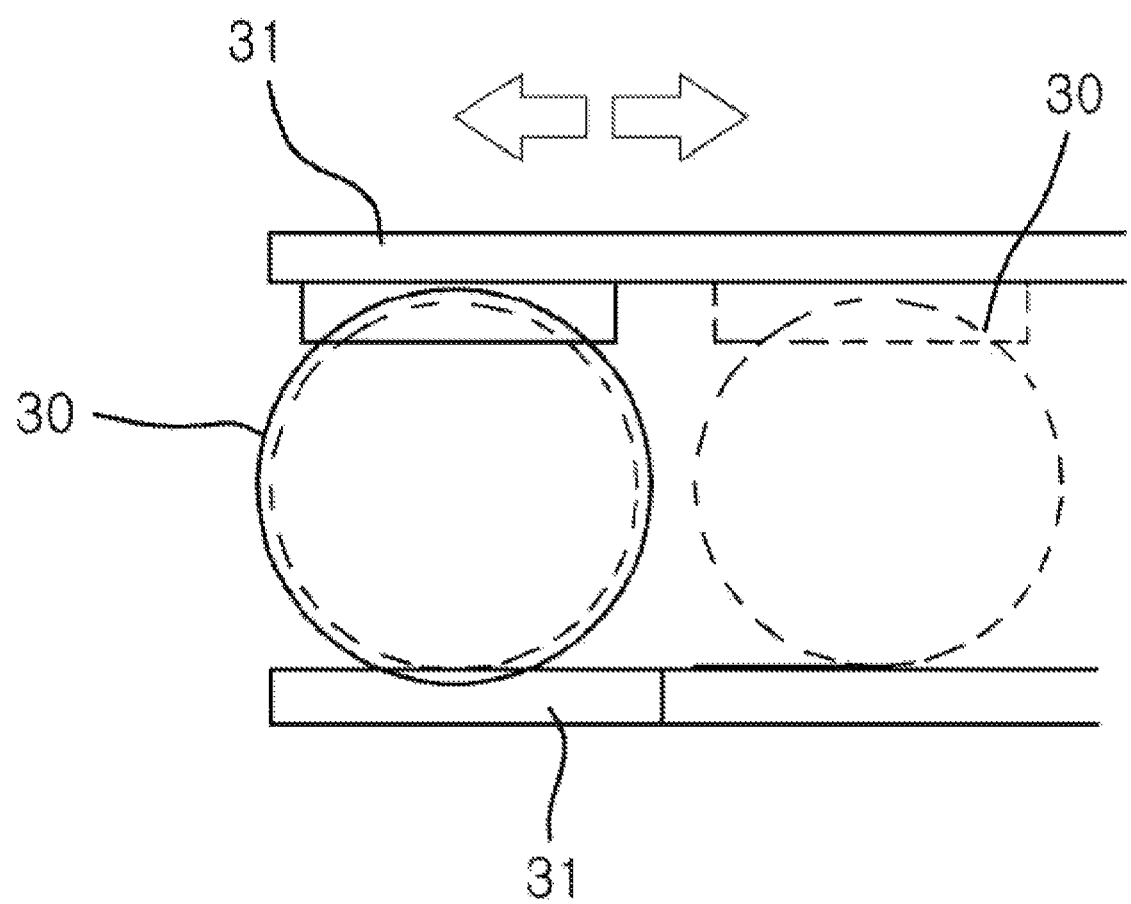
FIG. 11 is a plan view of main parts showing an installation state of a conduit switching valve for opening and closing an inlet of an auxiliary conduit or a conduit turbine unit.

As shown FIGS. 9 to 11, the auxiliary conduit system 200 includes multi-level auxiliary conduits 33, conduit switching valve main bodies 35, drain conduits 29 and 34, and filling conduits 32 and 36, and serves to enable the entire system to normally be operated by stopping a corresponding portion without stopping the entire generator when any one of the conduit turbine units 100 is required to be replaced or repaired.

In other words, as shown in the drawing, sections in which the conduit turbine units 100 are repeatedly installed in multiple levels are divided into 5 sections A, B, C, D, and E as an example, and a single (illustrated example) or a plurality of conduit turbine units 100 are configured for each section.

Positions of two conduit switching valves 30 are shifted in the conduit switching valve main body 35, so that a conduit switching function is performed. For example, the fluid flowing in the upper conduit 22 flows to the lower conduit 22, the fluid flowing in the upper conduit 22 is switched and flows to the lower auxiliary conduit 33, or conversely, the fluid flowing in the upper auxiliary conduit 33 is converted and flows to the lower conduit 22.

The positions of the switching valves 33 are switched by a cylinder device 31, so as to be operated to open one and close the other one of two conduit inlets positioned thereabove or therebelow.

When the entire conduit turbine units 100 are in operation, all conduit switching valves 30 are moved toward the auxiliary conduit 33 to close passages on the side of the auxiliary conduit 33, and thus entire passage of the conduit 22 remains open.

The drain conduit 29 and 34 are formed above the conduit switching valve main body 35, and connected and piped to the conduit 22 and the auxiliary conduit 33, respectively. A discharge water guide pipe 44 is connected to the drain conduits 29 and 34 through valves 47 and 48 to selectively control opening of the flow path, in which the water therein is discharged to the outside through the discharge water guide pipe 44 when the valves 47 and 48 are opened. The discharge water guide pipe 44 attached to the drain conduit 29 and 34 may discharge water when the valves 48 and 47 are opened, and the discharge water guide pipe 44 is connected to a river or lower water storage tank 59.

In addition, the filling conduits 32 and 36 are provided below the conduit switching valve main body 35 and connected and piped to the conduit 22 and the auxiliary conduit 33, respectively. The filling water guide pipes 32 and 36 are connected to the filling water conduits 42 through the valves 46 and 45 to selectively control the opening of the flow path, in which water is filled therein through the filling water guide pipe 42 when the valves 46 and 45 are opened. The filling water guide pipe 42 is connected to the upper water storage tank 49, the water flows through the filling water guide pipe 42 when the valve 43 is opened, the valve 43 is closed in a normal situation, and the valve 43 is opened so that the filling is performed only when water is filled in the conduit.

The hydroelectric power generator according to the present invention configured in the above manner generates the electric power through the generator 10 by dropping water through the water guide pipe 50 connected to an upper portion of the conduit turbine units 100 installed in multiple levels, when the flow amount is stored in the upper water storage tank 49 by the dam or water-pumping.

The valve 61 is piped between the water guide pipe 50 and the conduit turbine unit 100, and the air vent pipes 38 equipped with the air vents 39 are additionally installed in each section (not shown in FIG. 9), so that the air inside the conduit 22 may be discharged to the outside. The last conduit turbine unit 100 is connected to the discharge conduit 57, the valve 43 and the discharge port 58, and water from the discharge port 58 may be discharged to a river or lower water storage tank 59.

Hereinafter, operations of the hydroelectric power generator according to the present invention will be described.

When the valve 61 of the water guide pipe 50 and the valve 62 of the discharge conduit 57 are opened, the fluid of the conduit 22 is discharged to the river or lower water storage tank 59 through the discharge port 58, and the propeller 7 is rotated by the flow of the fluid, so that electricity is generated from the generator 10 to which the motive power is transmitted by the ball chain 17.

Meanwhile, when a breakdown occurs in any one of the conduit turbine unit 100 installed in multiple levels, and when the entire generator stops operating, the supply of electricity is cut off, and thus the operating efficiency is lowered and the total amount of power generation is reduced. In order to prevent the above situation, the corresponding conduit turbine unit 100 may be repaired or replaced through the auxiliary conduit system using the auxiliary conduit 33 while preventing the entire generator from being stopped.

Thus, as shown in the drawing, when sections of the conduit turbine units 100 repeatedly installed are divided into 5 sections A, B, C, D, and E as an example, the case in which the conduit turbine unit 100 in section C is replaced and repaired will be described.

A water flow is switched to the auxiliary conduit 33 in section C to block the generation power in section C and block the water supply to the conduit turbine unit 100 in section C.

The two conduit switching valves 30 blocking an inlet and an outlet of the auxiliary conduit 33 in section C are slowly moved to an inlet and an outlet of the conduit turbine unit 100 to be blocked.

Upon the above state, the fluid in the conduit flows through the auxiliary conduit 33 in section C via a volume of the conduit switching valve main body 35 in a front of section C, and the fluid flows to the conduit turbine unit 100 in the next section, section D, via a volume of the conduit switching valve 35 in a rear side.

Meanwhile, prior thereto, the auxiliary conduit 33 in section C may be filled with water. After the valve 45 connected to the filling conduit 36 toward the auxiliary conduit is opened, the valve 43 of the filling water guide pipe 42 is opened, so that water may be filled in the auxiliary conduit 33 or the like in section C through the filling water guide pipe 42 directly connected to the upper water storage tank 49.

Meanwhile, the water filled in the conduit 22 or the like in section C may be drained first after the conduit is switched and before the conduit turbine unit 100 in section C is repaired or replaced. When the valve 48 of the discharge water guide pipe 44 connected to the drain conduit 29 piped under the conduit turbine unit 100 in section C is opened, the water is drained through the discharge conduit 44, and thereafter, the valve 48 is closed again so that the conduit turbine unit 100 is replaced or repaired.

Meanwhile, after the conduit turbine unit 100 in section C is repaired or replaced, the conduit switching is conducted, in which the switching is conducted between the auxiliary conduit 33 and the conduit turbine unit 100.

When the conduit switching valves 30 closing the inlet and the outlet of the conduit turbine unit 100 in section C are slowly opened, the valves are moved toward the inlet and outlet of the auxiliary conduit 33, so that the inlet and the outlet of the auxiliary conduit 33 are closed. Accordingly, the conduit turbine unit 100 in section C also becomes capable of generating electric power, and the generated electric power may be connected to the electric system.

In order to start power generation again, water may be filled into the conduit turbine unit 100 in section C first. In other words, the valve 46 provided in the filling water guide pipe 42 of section C is opened and the valve 46 is closed when the water is filled through the filling water pipe 42

Further, when the valve 47 piped to the drain conduit 34 is opened in order to drain the water in the auxiliary conduit 33 of section C, the water is discharged through the discharge water guide pipe 44, and then the valve 47 is closed.

Accordingly, when the streamline of the conduit is switched during the replacement or repair work process of the conduit turbine unit 100, the switching is performed concurrently, so there is no change in state energy of the fluid flowing to the next section, section D in the process of opening and closing the conduit switching valves 30 piped up and down.

The replacement or repair of the conduit turbine unit 100 in a broken section may be completed. In the above process, the power supply is not interrupted, but can be stably maintained.

Although the present invention has been described in detail by using embodiments, the description is merely to specifically explain the present invention. The hydroelectric power generator using the conduit turbine according to the present invention is not limited thereto, and it will be apparent that various deformations and modifications are available by a person having ordinary skill in the art within the scope without departing from the technical idea of the present invention.

The simple deformations and modifications are construed to be within the scope of the invention, and the scope of the present invention shall be definite by the following claims.

The invention claimed is:

1. A hydroelectric power generator using a conduit turbine including at least two conduit turbine units serially arranged in multiple levels, the conduit turbine units each comprising:
   a driving shaft which penetrates the center of a conduit into which a flow for electric generation passes;
   conduit support main bodies provided so as to support the driving shaft and be rotated freely, and having an arm extending towards the inner surface of the conduit;
   a propeller disposed between the conduit support main bodies, fixed to the driving shaft, and rotated by means of a flow movement;
   an internal gear rotated between the conduit support main bodies together with the driving shaft;
   an external gear driven outside the conduit together with a shaft as a rotational force is delivered to the internal gear by means of a ball chain; and
   an electric generator which generates electricity by receiving the rotational force of the external gear and the shaft,
   wherein a pressure support integrally coupled with the driving shaft is installed at a tip of the conduit support main body, and a thrust bearing is provided at a contact portion between the conduit support main body and the pressure support.

2. The hydroelectric power generator of claim 1, wherein a flexible pipe having a corrugated pipe structure is further installed while extending from a lower end of the conduit.

3. The hydroelectric power generator of claim 1, wherein an auxiliary conduit system is further installed outside the tube conduit two conduit turbine units continuous arranged in multi levels.

4. The hydroelectric power generator of claim 3, wherein the auxiliary conduit system further includes an auxiliary conduit, and a conduit switching valve main body for switching a flow path by a conduit switching valve position-switched toward the conduit turbine unit and toward the auxiliary conduit by a cylinder device.

5. The hydroelectric power generator of claim 4, wherein the auxiliary conduit system includes:
   two drain conduits connected to the conduit and the auxiliary conduit from the top of the conduit switching valve main body, respectively;
   two filling conduits connected to the conduit and the auxiliary conduit from the bottom of the conduit switching valve main body, respectively;
   a discharge water pipe connected to selectively drain water from the two drain conduits; and
   a filling water pipe connected to selectively fill the two filling conduits with water.

6. The hydroelectric power generator of claim 1, wherein the arm of the conduit support main body has a flat plate shape, and has a length longer than a radius of the conduit in an axial direction.

* * * * *